Feb. 20, 1951      S. RUBEN      2,542,575
ALKALINE DRY CELL
Filed July 11, 1946
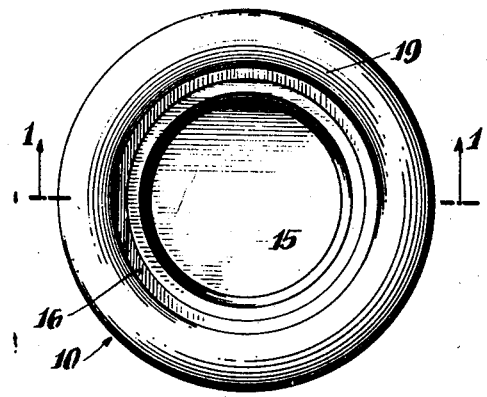
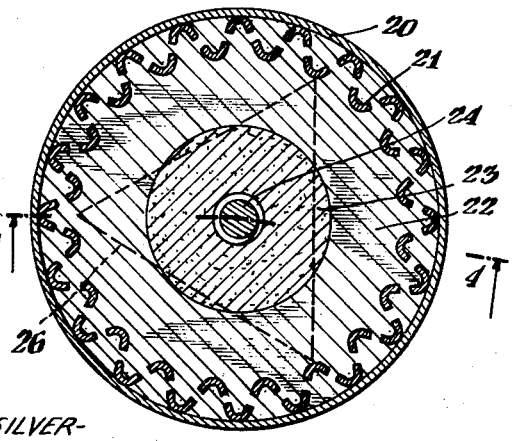
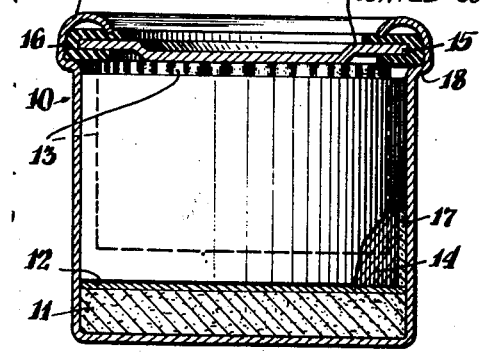
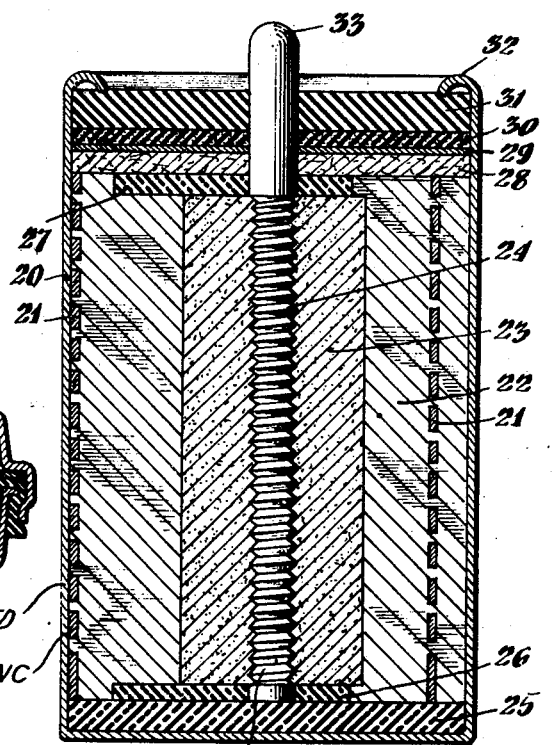
INVENTOR.
Samuel Ruben
BY *Nicholas Langer*
ATTORNEY Patented Feb. 20, 1951

2,542,575

UNITED STATES PATENT OFFICE 2,542,575

ALKALINE DRY CELL

Samuel Ruben, New Rochelle, N. Y.

Application July 11, 1946, Serial No. 682,734

13 Claims. (Cl. 136—107)

This invention relates to alkaline dry cells.

This application is a continuation-in-part of co-pending applications Serial No. 604,269, filed July 10, 1945, (now U. S. Letters Patent 2,422,045), Serial Number 522,587, filed February 16, 1944, Serial Number 671,200, filed May 21, 1946, and Serial No. 674,588, filed June 5, 1946, by Samuel Ruben.

An object of the invention is to improve alkaline primary cells.

Another object is to produce a sealed alkaline primary cell which is free from gas generation or electrolyte leakage on shelf life, during active use in the delivery of current and after the cell has been completely discharged.

In my Patent No. 2,422,045, there is described a sealed alkaline primary cell having an amalgamated zinc anode, a cathode formed of a coherent conductive body containing an electrolytically reducible oxygen-yielding compound (such as mercuric oxide) and an immobilized electrolyte comprising an aqueous solution of an alkali metal hydroxide (such as potassium hydroxide) containing a substantial quantity of alkali metal zincate. The presence of the zincate in the electrolyte, in combination with other features described in that application, prevents or strongly inhibits any tendency for a chemical hydrogen-generating reaction to take place between the electrolyte and the zinc anode when the cell is stored on the shelf prior to use as well as during active use. These factors have made possible a sealed alkaline dry cell which does not generate substantial gas or leak electrolyte during shelf life or when in use.

In most of the forms of cells illustrated in my patent, Patent No. 2,422,045, the enclosing wall which is in contact with the amalgamated zinc anode and comprising the terminal therefor is also formed of amalgamated zinc. In such cells, one of two conditions can prevail at the end of the cell life.

1. If the combined amount of zinc in the anode and closure wall is in excess of the electrochemical equivalent of the depolarizer in the cathode, then the depolarizer will be consumed before all of the zinc has been converted to zinc hydroxide. If the cell is thereafter continued in a closed circuit the electrochemical reaction will generate hydrogen gas at the depleted cathode. If some means of end-of-life venting is provided, this gas may be allowed to escape but may carry with it some of the alkaline electrolyte. If no venting means is provided the cell may swell up until the seal is broken and gas and electrolyte is forced out.

2. If the depolarizer is sufficient to last until all the zinc of the anode and the closure wall is consumed then the closure wall will eventually be eaten through if the cell is left on a closed circuit, and electrolyte will then escape.

A feature of the present invention resides in the use of a retaining wall and terminal in contact with the amalgamated zinc anode of an alkaline primary cell which retaining wall is insoluble in the alkaline electrolyte, has a low potential to zinc amalgam. The preferred materials are copper, copper alloys and silver. A further feature resides in the provision of a balance between the amount of zinc in the anode and the amount of available oxygen in the depolarizer of the cathode so that both anode and cathode are consumed substantially simultaneously. The invention is of particular advantage in cells using a mercuric oxide depolarizer. When such a cell combination is used with an alkaline electrolyte containing a substantial quantity of zincate the invention makes possible a sealed alkaline dry cell which is leakproof, that is, is free of any tendency to electrolyte leakage or gas generation during shelf life, current generating life and at end of life. Such a cell can safely be used in any sort of equipment without hazard of damage due to electrolyte leakage or cell disintegration, even if the cell is allowed to remain in the equipment long after the end of its useful life. A clean, dry, uncorroded and uncorrosive exterior is presented by the cell at all times.

In the drawings:

Figure 1 is a longitudinal section through an alkaline dry cell embodying features of the present invention;

Figure 2 is a top view thereof;

Figures 3 and 4 are transverse and longitudinal sections, respectively, of a modified cell embodying features of the invention;

Figure 5 is a section through another cell structure; and

Figure 6 shows a modified spacer element for the cell of Figure 5.

The invention is applicable to a variety of primary cell structures, certain of which are illustrated. Its application to other alkaline primary cell structures will be readily apparent and the invention is intended to be construed broadly within the spirit and scope of the appended claims.

Referring to the drawings, Figures 1 and 2 illustrate a sealed alkaline primary cell comprising a drawn steel container 10, a cathode-depolarizer layer 11 pressed in the bottom thereof, an electrolyte-permeable barrier layer 12 covering the cathode surface, and a corrugated zinc foil anode 13 interwound with a porous paper spacer 14 disposed in the container over the barrier layer. The cell is closed with a closure disc 15 which is sealed in the mouth of container 10 by an insulating grommet 16.

The cathode 11 is formed of an intimate mixture of finely-divided mercuric oxide with sufficient micronized graphite to render it conductive. A mixture of mercuric oxide and 5 to 10% graphite is preferred. The powders are intimately mixed and compressed into pellets. These pellets are reground into granules which are then compressed into the bottom of clean steel container 10.

The anode-spacer assembly is formed by winding up a strip of corrugated zinc foil 13 with interleaved porous paper strips 14 in offset relation so that the edge of the foil projects slightly from one end of the roll and the edge of the paper projects at the other end of the roll. One or two layers of a pure wood cellulose fibre paper, such as filter paper or Dexter paper, or of a cotton fibre paper such as Feltril paper are suitable for the paper spacer 14. The paper strips are longer than the zinc strip and overlap it on the outside of the roll by one or two turns. The roll is inserted in an impervious insulating sleeve 17, of an alkali resistant plastic, such as polystyrene.

The cell electrolyte is formed of an aqueous solution of potassium hydroxide containing a substantial quantity of potassium zincate. The preferred range of concentration of the potassium hydroxide used in preparing the electrolyte for a cell of the construction shown in Figure 1 and most other cell structures is from thirty to fifty per cent (30 to 50%) KOH. Concentrations above and below these limits can be used but generally result in lower cell output efficiencies. However, this depends considerably upon the cell construction and conditions of use and it is feasible with certain of the structures illustrated to depart rather widely from the preferred range, even to the extent of using such a high concentration of KOH as to produce an electrolyte which is solid at normal temperatures.

For minimum attack on the amalgamated zinc anode by the electrolyte when the cell is standing on open circuit, the electrolyte should contain all the zinc it will take up at the temperatures to which the cell is to be subjected. However, I have found that proportions of zincate down to about one-half this optimum concentration will, in many cases, particularly for moderate temperature uses, produce only minute gas generation, the rate being sufficiently slow to permit generated gas to diffuse out of the cell through the grommet or other sealing means without deleteriously affecting the desired airtight enclosure of internal cell elements. The quantity of zinc which will dissolve in the electrolytes appears to be proportional to the alkali concentration. It is preferred that the electrolyte shall contain about from ten to twenty grams (10 to 20 gms.) of zinc for each one hundred grams (100 gms.) of KOH used in preparing the electrolyte. It is apparent that the reaction of zinc or zinc oxide with the potassium hydroxide in preparing the electrolyte will convert part of the potassium hydroxide to potassium zincate. The best range for electrolytes made from thirty to fifty per cent (30 to 50%) KOH solution is about fifteen to seventeen grams (15 to 17 gms.) of zinc per one hundred grams (100 gms.) of KOH used.

I have made a satisfactory electrolyte for cells of the type shown in Figure 1 by adding seventy-five grams (75 gms.) of C. P. potassium hydroxide (containing 88% KOH) to twenty-five milliliters (25 ml.) of water, adding twelve grams (12 gms.) of zinc oxide, stirring and heating to one hundred eighty to one hundred ninety degrees centigrade (180–190° C.). The solution was then allowed to cool to one hundred ten degrees centigrade (110° C.), after which twenty-five milliliters (25 ml.) of water was added and the solution stirred and cooled to eighty degrees centigrade (80° C.) An additional fifty milliliters (50 ml.) of water was added and a clear solution was obtained. Made in this way the electrolyte does not precipitate any zinc oxide when cooled to room temperature. This solution appears to be about seventy-five per cent (75%) saturated with zinc at room temperature.

In cases where the volume of electrolyte is relatively small a more concentrated electrolyte may be used in order to have sufficient electrolyte capacity to utilize all the zinc and depolarizer. An electrolyte containing one hundred grams (100 gms.) of C. P. potassium hydroxide to one hundred milliliters (100 ml.) of water and sixteen grams (16 gms.) of zinc oxide, made by a similar method, has been used in some cells of small dimensions. It requires a minimum of about 0.22 gram of this electrolyte per gram of depolarizer (95% HgO, 5% graphite) for complete utilization of the electrodes. With lower KOH concentrations a larger amount of electrolyte is required.

Since amalgamated zinc foil is too brittle to wind into a roll the amalgamation is performed after winding. The roll is first impregnated with electrolyte which causes the spacer 35 to swell into the space afforded by the corrugations in the zinc foil. A measured quantity of mercury is distributed on top of the roll in contact with the zinc, the amount of mercury used depending on the area and weight of the zinc and is determined by calculation or experiment. Desirable proportions of mercury are five to twenty per cent (5 to 20%) of the weight of the zinc. The roll is then placed on a porous suction plate which draws the mercury into the roll and removes excess electrolyte. The electrolyte promotes spreading of the mercury so that the entire zinc surface becomes amalgamated in a short time.

Barrier layer 12 is formed of a minutely porous electrolyte-permeable material such as organic film or fibrous sheets or pressed discs of powdered organic or inorganic material which are substantially inert to the electrolyte and depolarizer. Suitable materials are sheet polystyrene fibre, nylon fibre, pressed powders of polystyrene, pressed discs of magnesium silicate or magnesium hydroxide powder, pressed ceramic or glass powder, or purified sheet asbestos. Glycerine plasticized sheets of polyvinyl alcohol as well as parchment paper of dialysis grade and regenerated sheet cellulose may also be used. The barrier prevents migration of graphite, mercury derived from reduction of the oxide during operation of the cell and impurities. In some cases, as with the solid or gelled KOH electrolyte, the electrolyte itself acts as a barrier.

In assembling the cell the barrier layer 35 is placed over the surface of the cathode and the electrolyte-impregnated anode roll is placed in the container with the projecting paper end in contact with the barrier. Electrolyte from the anode roll readily impregnates the barrier layer and wets the top face of the cathode.

Plastic grommet 16 is fitted over the edge of top disc 15 and the disc is then placed with its inner face in contact with the projecting edge of zinc foil anode 13. Container 10 is provided with a shoulder 18 upon which the grommet rests. The free edge 19 of container 10 is then turned or spun in over the grommet to apply pressure thereto and seal the cell. Grommet 16 is formed of a non-rigid alkali resistant plastic material such as rubber, neoprene, Saran (vinylidene chloride plastic), Styraloy (polystyrene and butadiene plastic) or the like.

In accordance with one aspect of the present invention the top disc 15 which forms a terminal for the zinc anode and also comprises an enclosing wall for the cell is formed of copper or of silver coated copper. Copper alloys having a low polarization potential difference to zinc in the alkaline electrolyte are also suitable, such as copper-cadmium alloys and copper-zinc alloys having not more than 10% of zinc. The copper may be used uncoated, or mercury amalgamated, but it is preferred to plate the surface of the disc with silver. The silver renders the surface more rapidly amalgamable and provides an improved low resistance contact with the amalgamated zinc anode inside the cell and with external circuit connections outside the cell.

Copper top discs 15 can be readily coated with a firm thin silver coating by a contact galvanic process which consists in tumbling the discs in the following solution for 5 minutes:

| | |
|---|---|
| Potassium cyanide grams | 20 |
| Silver chloride do | 6 |
| Potassium hydroxide do | 2 |
| Water liter | 1 |

Upon removal from the solution, washing and drying, the discs are ready for use. The discs can also be coated with silver by electroplating.

The inner silver or copper surface of the top disc becomes amalgamated by contact with the amalgamated zinc anode thereby forming an amalgam joint or bond with the anode when the cell is assembled.

By way of example, one cell having the construction shown in Figure 1 with a cathode of mercuric oxide mixed with 5% of graphite and pressed to a density of 7.2, had a diameter of 7/8 inch and was 5/8 inch high. The zinc anode formed of 5 mil zinc foil corrugated with 2 mil deep corrugations, the corrugated foil strip being 0.25 inches wide and 22 inches long. The foil was wound up with two 4 mil porous paper spacers 0.34 inch wide. The zinc projected 10 mils at the top of the roll and the paper 3/32 of an inch at the bottom. The barrier consisted of one disc of dialysis paper 3 mils thick.

Figures 3 and 4 illustrate a cylindrical cell utilizing a gelled alkaline electrolyte and embodying features of the invention. The container 20 is a drawn copper or copper alloy can. It may be used without a silver surface if amalgamated prior to assembly but preferably is given a thin silver coating in the same manner as described for discs 15 of Figure 1. In one embodiment, which will be described, copper can 20 has an inside diameter of one-half inch, a height of 1 7/8 inches and a wall thickness of 15 mils.

Anode member 21 is made by perforating a 15 mil zinc sheet with 325 holes of 33 mils diameter per square inch, and corrugating the sheet with 14 corrugations per inch to an overall thickness of 35 mils. The anode 21 is 1 1/2 inches square.

The copper can and zinc anode members are separately amalgamated for five minutes in a 3% mercuric nitrate solution at 55° C., washed and dried. The can is amalgamated on the inside only, the solution being poured into the can.

In assembling the cell an insulating disc 25, of mica or polystyrene, one-half inch in diameter is placed in the bottom of the can and corrugated anode member 21, bent into a cylinder, is forced into position over the disc, the corrugations pressing against the inside amalgamated silver wall of the copper can.

Electrolyte 22 comprises an aqueous alkali solution immobilized as a gel. The preferred electrolyte is formed of:

C. P. potassium hydroxide (88% KOH)

| | |
|---|---|
| grams | 100 |
| Zinc oxide do | 16 |
| Water ml | 100 |

This electrolyte when made as previously described is immobilized with 6 grams of sodium carboxymethylcellulose per 100 millilitres of the alkali zincate solution. In making the electrolyte the potassium is added to 25 millilitres of water and the zinc oxide added. This mixture is stirred and heated to 180–190° C. and then allowed to cool to 110° C., after which 25 ml. of water is added and the solution stirred and cooled to 80° C. The remaining 50 ml. of water is added, a clear solution being obtained. The sodium carboxymethylcellulose is crushed and screened through a 40 mesh screen and is added slowly to the solution, with constant stirring.

This dispersion is placed in the anode-can assembly, 4.6 grams (about 3 c. c.) being used. The can is then placed in an oven or oil bath and heated to slightly below the boiling point of the mixture 120° C. at which point a clear liquid solution is obtained which, upon cooling, will form a true gel." The can is then removed from the oven or oil bath and a steel rod 24 carrying pressed cathode layer 23 is inserted.

The cathode assembly is formed by pressing the depolarizer composition 23 onto threaded steel rod 24 so that the composition is bonded to the threads and forms good electrical contact therewith. A steel rod 0.16 inch in diameter threaded with an 8–32 thread is suitable. Ten grams of a depolarizer composition formed of finely divided mercuric oxide intimately mixed with 5% of graphite pressed onto the rod with a pressure of about 2500 pounds per square inch forms a cylinder about .312 mil in diameter and 1.5 inches long.

The steel rod protrudes at the ends of the depolarizer cylinder. Triangular mica washers 26 and 27 are pressed onto the bottom and top ends of the rod against the ends of the depolarizer cylinder 23, for centering the cathode and the cathode assembly is inserted in the anode can assembly. As the cathode assembly is lowered into the cell the hot liquid electrolyte rises to the top of the zinc anode member 21 and then solidifies to form a gel as it cools, the gel filling all free spaces between cathode 23 and can 20 and covering both sides of anode member 21.

A washer 28 of porous paper, such as a 60 mil sheet of pure cotton fibre paper, known as Feltril paper, is laid over the top surface of the gelled electrolyte and is impregnated with 0.05 c.c. of mineral oil or liquified petroleum jelly to provide an oil seal at the top of the cell. A second paper washer 29, which may also be Feltril paper, is laid on top of washer 28 and a layer 30 of a sealing cement, such as the synthetic rubber cement sold under the trade-mark Pliobond, is poured on top of the washer 29 and allowed to harden. A stiff insulating fibre washer 31 is placed over this and the edge 32 of the can 20 is turned in over this disc. The projecting terminal 33 of rod 24 is preferably tinned or silvered to provide a good electric contact connection.

In place of prior amalgamation of the interior of the container 20 it is possible to obtain satisfactory amalgamation of the silver surface simply by contact with the amalgamated zinc anode.

The quantity of the zinc in the anode is balanced with the depolarizing capacity of the cathode so that the zinc is fully consumed when all the available oxygen in the cathode has been used. An exact balance is desirable for most efficient use of cell materials, or a slight excess of depolarizer may be used. The cells are free of end of life gassing in either event. In one cell 3.5 grams of zinc was found to substantially balance 11.3 grams of depolarizer containing 95% mercuric oxide and 5% graphite, so that the zinc was completely consumed as the depolarizer ran out.

Figure 5 is a sectional view of a flat or disc-type primary cell embodying features of the invention. This cell comprises an anode formed of a shallow copper cup 40 (which may preferflange 41 at its edge and a layer 42 of amalgamated zinc powder or shot compressed in the bottom of the cup.

The zinc shot, if used, is of graduated sizes all of which pass through a 28 mesh screen. It is amalgamated with liquid mercury (90 grams zinc to 10 grams mercury) under a 15% ammonium hydroxide solution. The mixture is stirred or tumbled in a bottle until the mercury is well distributed after which the zinc is washed with water, vacuum dried at 80° C. and pressed into the cup 40.

Electrolyte layer 43, formed of a disc of the thick gel previously described, is laid on top of the layer 42. A molded grommet 44 of a plastic such as Saran or Styraloy or rubber is fitted over the free edge of cup 40.

A ring 45 (see Figure 2) of relatively impervious sheet material, such as polystyrene film, parchment paper, regenerated cellulose film or polyvinyl alcohol film is laid on the upper face of the grommet and electrolyte disc. A 5 mil thick ring of clear polystyrene film is most suitable. This ring extends from the outer edge of the grommet in over the edge of electrolyte disc 43 for a distance of 10 to 30% of the radius of the disc, and seals itself to the surface of the electrolyte disc.

The cathode member is compressed in the bottom of a shallow cup 46 of ferrous metal such as iron or steel, whose edge is formed with a flange having a flat circular portion 47 and a cylindrical portion 48 capable of fitting over the outer periphery of grommet 44. A layer 49 of the cathode-depolarizer composition is pressed into cup 46 to the level of flange portion 47. The preferred composition is formed of finely divided mercuric oxide intimately mixed with 5% of micronized graphite.

The assembly is completed by placing the cathode member down over the anode-electrolyte assembly and spinning in the edge 50 of flange 48 to compress the grommet and seal the cell. The spacing between anode and cathode is slightly less than the original thickness of electrolyte gel disc 43 so that pressure is applied thereto.

One practical cell of the construction shown in Figure 5 used copper anode cup 40 drawn from 20-mil sheet copper and a steel cathode cup 46 drawn from 15-mil sheet steel. For the cathode 11.3 grams of granulated mixture of 95% mercuric oxide and 5% graphite which had been pelleted at 10,000 pounds per square inch was consolidated in the steel cup at 30,000 p. s. i. to a thickness of 105 mils.

The anode comprising 3.5 grams of amalgamated zinc powder containing 15% mercury was pelleted at 5,000 p. s. i. to a disc 1.065 inch in diameter and then consolidated into the copper container at 15,000 p. s. i. to a thickness of 38 mils.

The electrolyte 43 was a $\frac{1}{16}$ inch thick molded gel disc .935 inch in diameter and weighing 3.06 grams. The ring 45 comprised a clear sheet polystyrene washer having an O. D. of 1.19 inches and an I. D. of 0.9 inch. The current capacity of the completed cell was 2.2 ampere hours.

A smaller cell of similar construction contained 1.5 grams of the depolarizer and .465 gram of the amalgamated zinc powder and had a current capacity of 300 milliampere-hours.

Figure 6 is a perspective view of a modified electrolyte-spacer element 53 for use in the cell of Figure 5, in place of element 43. Element 53 comprises a disc of porous absorbent sheet material impregnated with the electrolyte, which may be either the gel or the liquid previously described. The preferred absorbent material is a pure felted cotton fibre paper, such as Feltril paper, about 60 mils thick. Where the volume of liquid or gel electrolyte is small it may be desirable to preimpregnate the cathode 49 with liquid electrolyte before assembly to displace air and afford better electrolyte contact.

As is pointed out in application Serial No. 604,269, now Patent #2,422,045, the amalgamated zinc anode should have a large surface area, preferably at least equal to 20 square inches per gram of oxygen available from the depolarizer.

From the overall cell equation:

$$Zn + HgO + H_2O = Zn(OH)_2 + Hg$$

it is apparent that one mol of mercuric oxide is reduced to mercury for each gram atomic weight of zinc consumed at the anode. It is therefore apparent that if 100% utilization of materials is obtained an electrochemical balance between zinc and mercuric oxide will be present if these materials are used in the ratio of the atomic weight of zinc to the molecular weight of mercuric oxide, namely if the weight of zinc is 0.3 of the weight of mercuric oxide in the cell. On the basis of available oxygen in the depolarizer the weight of zinc should be 4 times the weight of available oxygen for a balance. If a slight excess of depolarizer is used, this ratio will, of course, be slightly less.

Using zinc amalgam containing 15% of mercury and a mercuric oxide depolarizer composition containing 5% graphite a balance is obtained with .334 gram of amalgam per gram of depolarizer.

It is apparent from the foregoing description that the novel primary cell combination described provides a leakproof dry cell which remains sealed during shelf life, during use and after end of life. This is made possible by the balance of materials of anode and cathode, the provision of inert cell enclosing walls, and the use of an alkaline electrolyte which does not chemically react with either electrode to generate gases at any time.

What is claimed is:

1. A sealed alkaline dry cell comprising an amalgamated zinc anode, a cathode-depolarizer member, an alkaline electrolyte, and an enclosure for said cell having a section thereof in contact with said anode, a contacting surface of said section comprising a metal having a low potential with respect to said zinc and insoluble in said electrolyte forming an amalgam bond with said anode, the amount of zinc in said anode being not more than the electrochemical equivalent of the depolarizing capacity of said cathode-depolarizer.

2. A sealed alkaline dry cell comprising an amalgamated zinc anode, a cathode-depolarizer member, an alkaline electrolyte, and an enclosure for said cell having a section thereof in contact with said anode, a contacting surface of said section comprising a metal having a low potential with respect to said zinc and insoluble in said electrolyte forming an amalgam bond with said anode, the amount of zinc in said anode being not more than the electrochemical equivalent of the depolarizing capacity of said cathode-depolarizer and being in the order of four times the weight of available oxygen in the cell.

3. A sealed alkaline dry cell comprising an amalgamated zinc anode, a cathode-depolarizer member comprising mercuric oxide, an alkaline electrolyte, and an enclosure for said cell having a section thereof in contact with said anode, a contacting surface of said section comprising a metal having a low potential with respect to said zinc and insoluble in said electrolyte forming an amalgam bond with said anode, the amount of zinc in said anode being not more than the electro-chemical equivalent of the depolarizing capacity of said cathode-depolarizer and being in the order of three-tenths of the weight of mercuric oxide in said cell.

4. The combination, in an alkaline dry cell in which no appreciable hydrogen is generated on open circuit, of an amalgamated zinc anode, an alkaline electrolyte, an air-excluding enclosure a section of which comprises a metal surface in contact with the anode having a low potential in respect thereto and being insoluble in said electrolyte, said contacting metal surface forming an amalgam bond with said anode, and a cathode-depolarizer comprising a dissociable oxygen producing compound, the amount of zinc in said anode being so proportioned to the available oxygen from said cathode-depolarizer that all of said zinc is utilized prior to or simultaneously with the exhaustion of available oxygen, said cell being incapable of any appreciable gas generation after exhaustion of the zinc or the depolarizer.

5. An alkaline primary cell comprising an amalgamated zinc anode, a copper base terminal member in contact and forming an amalgam bond therewith, an immobilized electrolyte, and a cathode-depolarizer, the amount of zinc present in the anode being no greater than that required to exhaust the depolarizing capacity of the cathode-depolarizer.

6. A sealed alkaline dry cell comprising an amalgamated zinc anode, a cathode-depolarizer member, an alkaline electrolyte, and an enclosure for said cell having a section thereof in contact with said anode, a contacting surface of said section comprising an amalgamable copper or silver base metal adapted to form an amalgam bond with said amalgamated anode, the amount of zinc in said anode being not more than the electrochemical equivalent of the depolarizing capacity of said cathode-depolarizer.

7. A sealed alkaline primary cell comprising an amalgamated zinc anode, a cathode formed of a coherent conductive body containing an electrolytically reducible oxygen-yielding compound, an alkaline electrolyte in contact with said electrodes, and a terminal for said cell comprising a metal wall at least the inside surface of which is formed of mercury amalgamated metal selected from the group consisting of silver and copper, said metal wall comprising part of the cell enclosure in contact with said zinc anode and forming an amalgam bond therewith, the weight of the zinc in said anode being equal to not more than 4 times the weight of available oxygen in said cathode.

8. A sealed alkaline dry cell comprising an amalgamated zinc anode, a cathode formed of a coherent conductive body containing an electrolytically reducible oxygen-yielding compound, an alkaline electrolyte in contact with said electrodes, a terminal for said cell comprising a copper base wall comprising part of the cell enclosure in contact with said zinc anode, and a silver coating on at least the inside surface of said copper wall and in contact with said anode and forming an amalgam bond therewith.

9. An alkaline dry cell comprising a sealed container enclosing a coherent conductive cathode formed of mercuric oxide and finely divided graphite intimately intermixed, an anode of amalgamated zinc of large surface area, and an electrolyte formed of an aqueous solution of potassium hydroxide containing a substantial proportion of potassium zincate, a part of said container wall having at least the surface thereof formed of metal selected from the group consisting of copper and silver, said surface being in contact with said anode and forming an amalgam band therewith, the amount of zinc in said anode being not more than electrochemically equivalent to the depolarizing capacity of said cathode.

10. An alkaline primary cell comprising a sealed container enclosing a coherent conductive cathode formed of mercuric oxide and finely divided graphite intimately intermixed, an anode of amalgamated zinc of large surface area, and an electrolyte formed of an aqueous solution of potassium hydroxide containing a substantial proportion of potassium zincate, a part of said container wall having at least the surface thereof formed of metal selected from the group consisting of copper and silver, said surface being in contact with said anode and forming an amalgam bond therewith, the weight of zinc in said anode being not greater than 0.3 of the weight of mercuric oxide in said cathode.

11. An alkaline primary cell comprising a sealed container comprising a steel wall portion and a copper wall portion and an insulating sealing annulus separating said wall portions and effecting a seal between them, a coherent conductive cathode formed of mercuric oxide and finely divided graphite intimately intermixed, said cathode being within said cell in contact with said steel wall, an anode of amalgamated zinc characterized by a large surface area within said cell in contact with said copper wall, and an immobilized electrolyte in contact with said anode and cathode formed of an aqueous solution of potassium hydroxide containing potassium zincate, the zinc in said potassium zincate amounting to between 10 and 20 grams of zinc for each 100 grams of KOH used in forming said solution, the weight of the zinc in said anode being not greater than 0.3 of the weight of mercuric oxide in said cathode.

12. In an alkaline primary cell, an anode comprising amalgamated zinc, a cathode-depolarizer, an alkaline electrolyte, a housing for said anode forming a terminal of the cell and with which said anode has been consolidated, said housing comprising copper, a mercury amalgam bond joining said terminal and said anode.

13. In an alkaline primary cell, an inert metal member forming part of the case of said cell, a cathode-depolarizer comprising mercuric oxide housed in said metal member and consolidated therewith, an anode comprising amalgamated zinc, an alkaline electrolyte, barrier means between said mercuric oxide and anode to prevent migration of mercury derived from reduction of mercuric oxide during operation of the cell, an amalgamated copper base terminal member in contact with the anode, and forming part of the cell closure the amount of zinc in said anode being not more than the electrochemical equivalent of the depolarizing capacity of said cathode-depolarizer.

SAMUEL RUBEN.

REFERENCES CITED

The following references are of record in the file of this patent:

UNITED STATES PATENTS

| Number | Name | Date |
|---|---|---|
| 720,592 | Kohn | Feb. 17, 1903 |
| 905,952 | Szek | Dec. 8, 1908 |
| 1,163,163 | Lutz | Dec. 7, 1915 |
| 1,602,915 | Little et al. | Oct. 12, 1926 |
| 1,824,626 | Ruhoff et al. | Sept. 22, 1931 |
| 2,317,711 | Andre | Apr. 27, 1943 |
| 2,422,045 | Ruben | June 10, 1947 |

FOREIGN PATENTS

| Number | Country | Date |
|---|---|---|
| 24,473 | Great Britain | 1896 |
| 129,423 | Great Britain | July 8, 1919 |
| 862,859 | France | Dec. 23, 1940 |

OTHER REFERENCES

Windred, "Electrical Contacts," MacMillan and Company, 1940, pages 324 and 325.